United States Patent [19]

Hunsucker et al.

[11] 4,323,624
[45] Apr. 6, 1982

[54] METHOD OF PREPARING WRINKLE-RESISTANT FABRIC

[75] Inventors: Jerry H. Hunsucker; Milton E. Woods, both of Terre Haute, Ind.

[73] Assignee: International Minerals & Chemical Corp., Terre Haute, Ind.

[21] Appl. No.: 210,988

[22] Filed: Nov. 28, 1980

Related U.S. Application Data

[60] Division of Ser. No. 170,437, Jul. 21, 1980, which is a continuation-in-part of Ser. No. 63,221, Aug. 3, 1979, abandoned.

[51] Int. Cl.³ .................... B06D 13/34; B05D 3/02; B32B 7/00; B32B 27/42
[52] U.S. Cl. .................... 428/270; 8/127.6; 8/128 A; 8/185; 8/189; 8/195; 8/196; 427/393.2; 427/389; 427/392; 428/274; 428/278; 525/509; 528/367; 528/369; 528/422

[58] Field of Search ............... 8/115.6, 117, 181, 185, 8/187, 189, 195, 196, 127.6, 128 A; 252/8.6; 427/393.2, 389, 392; 525/509; 528/367, 369, 422; 428/270, 274, 278

[56] References Cited

U.S. PATENT DOCUMENTS

| | | | |
|---|---|---|---|
| 2,876,062 | 3/1959 | Torke et al. | 427/393.2 X |
| 2,917,411 | 12/1959 | Kress | 427/393.2 X |
| 3,402,989 | 9/1968 | Canter et al. | 8/187 X |
| 3,917,558 | 11/1975 | Gardikes et al. | 260/38 |
| 3,920,390 | 11/1975 | Petersen et al. | 8/185 |
| 3,930,087 | 12/1975 | Petersen et al. | 428/278 |
| 4,127,382 | 11/1978 | Perry | 8/181 |

*Primary Examiner*—Michael R. Lusignan
*Attorney, Agent, or Firm*—Robert H. Dewey

[57] ABSTRACT

A composition comprising a mixture of a curable urea-aldehyde resin or other crosslinking agent and a nitroalkanol or nitroalkane and having particular utility for treating textiles and non-woven cellulose products to provide permanent press and wrinkle-resistant characteristics.

32 Claims, No Drawings

METHOD OF PREPARING WRINKLE-RESISTANT FABRIC

CROSS-REFERENCE TO RELATED APPLICATIONS

This is a division of copending application Ser. No. 170,437, filed July 21, 1980, which is a continuation-in-part of applicants' application Ser. No. 063,221 filed Aug. 3, 1979, and now abandoned.

BACKGROUND OF THE INVENTION

This invention relates to a urea-aldehyde composition. In a particular aspect this invention relates to a composition of urea-aldehyde resin having particular utility for treating textiles and non-woven cellulose products.

The importance of dimensional stability, such as wrinkle resistance and durable press properties in textile fabrics and non-woven cellulose products are well established and are of great importance and economic value to the textile industry. The majority of textile articles, both wearing apparel and household articles, available in the marketplace exhibit these properties to some beneficial degree. Although many synthetic fibers inherently possess resiliency and wrinkle resistance, fabrics containing cellulose fibers must be chemically treated to acquire these important properties needed for the modern textile market.

In addition to wrinkle resistance and permanent press properties, it is highly desirable that non-woven cellulosic products display good wet strength characteristics. Yet most paper goods are especially deficient in wet strength unless they are treated.

The principal chemical treatments which produce wrinkle resistance and durable press properties in cellulose-containing textiles and non-woven products are those in which the cellulose molecules are crosslinked, generally by reaction of a di- or poly-functional agent with the cellulose. Many of the agents employed by the textile processing industry to produce durable press properties in cellulosic fabrics are N-methylol adducts formed by reacting nitrogen-containing compounds with formaldehyde. To enhance the reactions between the cellulose and these adducts many compounds or catalysts may be employed.

At present, urea-formaldehyde and urea-glyoxal resins (i.e. the ethylene ureas) are used in large volume. However, glyoxal is a high-cost raw material and it would be advantageous to employ the more economical urea-formaldehyde resin. Other products commonly used to impart wrinkle resistance include cellulose crosslinking agents such as carbamates, triazones, melamines, and methylol melamines.

These products all present another problem, namely, they result in residual free aldehyde, e.g. formaldehyde, on the cloth or other object which is objectionable because it tends to pollute the environment. Similarly, many other industries employing formaldehyde-based resins are faced with occupational health problems involving formaldehyde.

SUMMARY OF THE INVENTION

It is an object of this invention to provide an improved method for treating cellulosic and other fibers. It is another object of this invention to provide a urea-aldehyde resin mixture having particular utility for treating textiles and nonwoven cellulose products.

It is yet another object of this invention to provide a method for reducing the amount of residual free aldehyde on cellulosic products which have been treated with an aldehyde-based crosslinking agent such as a urea-aldehyde resin or other aldehyde-based resin or monomer.

It is still yet another object of this invention to provide a method of improving the hand of textiles.

Other objects of this invention will be apparent to those skilled in the art from the description herein.

It is the discovery of this invention to provide a composition comprising a mixture of a crosslinking agent, such as a curable urea-aldehyde or other aldehyde-based resin or crosslinking agent, with a nitroalkane or of a nitroalkanol, said nitroalkanol being represented by the formula

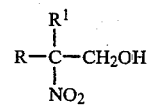

where R and R1 are hydrogen, methyl, ethyl or hydroxymethyl and can be the same or different. Preferably, but not necessarily, the mixture is provided as an aqueous dispersion or solution. It is also contemplated that the mixture can be prepared by the user immediately prior to application to the textile or fabric.

In place of the nitroalkanol, there can be substituted a nitroalkane of 1–3 carbon atoms in an amount equimolar to the amount of nitroalkanol employed. Furthermore, a mixture in any proportion of nitroalkane and nitroalkanol of the above formula can be employed.

It is an embodiment of the present invention that the residual free aldehyde in an aldehyde-containing resin, e.g. urea-formaldehyde or urea-glyoxal, or an aldehyde-based crosslinking agent or a product containing same can be significantly reduced by employing a nitroalkane or a nitroalkanol with the resin, e.g. a urea-aldehyde resin, or crosslinking agent. The term "aldehyde-based" is intended to mean that the resin or crosslinking agent has an aldehyde, usually formaldehyde, as one of the reactants in the manufacture thereof.

It is not the intent to limit the invention to textile treatment. Rather it is contemplated that nitroalkanols are useful with all aldehyde-based resins, monomers, crosslinking agents and processes and products employing then, such as phenol-formaldehyde resins, etc.

It is another embodiment of this invention to provide a method for improving the hand of wrinkle resistant textiles and non-woven fabrics by treating them with a nitroalkanol of the foregoing formula.

DETAILED DISCUSSION

The composition of this invention is a mixture of a resin, monomer or other crosslinking agent, generally but not necessarily adapted to conferring wrinkle resistance and durable press properties to textiles, such as a curable urea-aldehyde or other aldehyde-containing resin or monomer thereof, many of which are known, and a nitroalkanol or a nitroalkane or mixture thereof. The term "curable" is intended to mean that the crosslinking agent, monomer or resin is incompletely polymerized and is capable of further reaction with crosslinking agents and the like. Hereinafter, the term "crosslinking agent" is intended to include aldehyde-based monomers, resins and binders.

The urea-aldehyde resin of this invention is either a urea-formaldehyde resin or a urea-glyoxal resin (i.e. ethylene urea), preferably urea-formaldehyde. Substituted ureas may also be used in forming the resin. Instead of resins, many aldehyde-based monomeric substances are used as crosslinking agents for the molecules of the textile. Commonly used ones include, but are not limited to carbamates such as 2-methylethylcarbamate; modified melamines, such as methylated methylol melamines; the ethylene ureas such as disclosed in U.S. Pat. No. 2,917,411; and triazones, such as disclosed in U.S. Pat. No. 3,402,989, having the formula

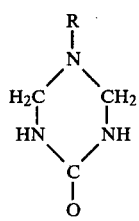

where R is alkyl or hydroxyalkyl of 1–4 carbon atoms. More particularly, the following compounds, all of which are prepared using an aldehyde, namely formaldehyde, as a raw material, are commonly used: dimethylolurea; dimethoxymethylurea; methoxymethylmelamine (trimethoxymethyl to hexamethoxy); dimethylolalkanediol diurethane; dimethylolethylene urea; dimethyloldihydroxyethylene urea; dimethylolpropylene urea; dimethylol-4-methoxy-5,5-dimethylpropylene urea; dimethylol-5-hydroxypropylene urea; dimethylolhexahydrotriazinones; dimethoxymethylureone; tetramethylolacetylene diurea; dimethylol carbamates of the formula

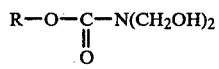

where R is alkyl, hydroxyalkyl, or alkoxyalkyl; methylolacrylamide dimethylolalkanediols. As is known in the art, such crosslinking agents are used with an acidic catalyst, e.g. magnesium chloride and zinc nitrate.

The process of this invention for greatly reducing or eliminating free formaldehyde, as well as other embodiments, can be used in processes using the above crosslinking agents.

The amount of nitroalkane or nitroalkanol used is not critical but when urea-formaldehyde is the resin, the amount used is in the range of from 0.25 to 3.0 moles per mole of urea used in preparing the resin. For example, urea-formaldehyde resin generally is prepared, as is known in the art, in a mole ratio of about 1 to 1–5 respectively. Accordingly, the amount of nitroalkane, e.g. nitromethane, used would be in the range of from about 5 to 90 g per 100 g resin, if the urea-formaldehyde is in a 1:5 ratio respectively; or if the urea-formaldehyde is in a ratio of 1:1, the amount of nitromethane would be in the range of from about 15–200 g of resin. If the nitroalkanol is 2-nitro-2-methyl-1-propanol (NMP), it is used in an amount of from about 115 to 350 g per 100 g of resin when the urea-formaldehyde is in a ratio of 1:1. When the ratio is 1:5 respectively, the NMP used is in the range of a out 50 to 150 g per 100 g of resin. When other nitroalkanes and/or nitroalkanols are used, the amounts are proportional to the nitromethane and/or NMP. When the resin is a urea-glyoxal type, comparable amounts of nitroalkane and/or nitroalkanol are used.

When other durable press resins or aldehyde-containing crosslinking agents are used, the amount of nitroalkanol or nitroalkane to be used is in the general range of 18 to 142 parts per 100 parts by weight of resin. However, the range is not critical.

It is another embodiment of this invention to react the urea-formaldehyde resin with up to 1.5 moles of glyoxal per mole of urea before mixing with the nitroalkanol or nitroalkane or mixture thereof. It is also contemplated that melamine can be employed as a crosslinking agent in place of the glyoxal.

The nitroalkanols useful in the practice are commercially available and include, but are not limited to tris(hydroxymethyl)nitromethane; 2-nitro-2-methyl-1,3-propanediol; 2-nitro-2-ethyl-1,3-propanediol; 2-nitro-1-butanol and, preferably, 2-nitro-2-methyl-1-propanol. Mixtures of these nitroalkanols can also be used. It is understood that the invention is not limited to these nitroalkanols. Other nitroalkanols are known in the art and are regarded as being the obvious equivalents of the foregoing.

The nitroalkanes useful in the practice of this invention are commercially available and include nitromethane, nitroethane, 1-nitropropane, 2-nitropropane and mixtures thereof. The total nitroalkane is preferably used in a proportion of about 0.5–1.0 mole, and 0.75 mole is particularly preferred, per mole of urea. It is understood that the invention is not limited to these nitroalkanes. Others are known in the art and are regarded as being the obvious equivalents of the foregoing.

When nitromethane is used as the nitroalkane, it is preferred also to add three moles of formaldehyde per mole of nitromethane. When nitroethane or 1-nitropropane are used, it is preferred to add two moles of formaldehyde per mole of nitroalkane. When 2-nitropropane is used, it is preferred to add one mole of formaldehyde per mole of nitroalkane.

The urea-aldehyde resins and other crosslinking agents useful in the practice of this invention are known in the art and are commercially available for the preparation of wrinkle-proof textiles and non-woven cellulosic products. The resins and other crosslinking agents are incompletely polymerized so that when impregnated, e.g. as an aqueous dispersion, onto the textile, further polymerization, or curing, takes place on heating.

Urea-formaldehyde resins used for this purpose are generally prepared by reacting the formaldehyde and urea under alkaline conditions, e.g. at a pH of about 7–11, preferably 8.0–10.5 and particularly at about 10.0–10.5. The pH can be provided by any alkaline reagent many of which are known, viz. inorganic carbonates, bicarbonates, oxides or hydroxides, including those of sodium, potassium and lithium. Sodium hydroxide is preferred.

The preferred urea-formaldehyde resins used in the practice of this invention are prepared at a mole ratio of from 4–6 moles of formaldehyde per mole urea. Such resins are generally known to those skilled in the art as uron resins as distinguished from those formed at a mole ratio of up to 3:1. Analysis by measurement of nuclear magnetic resonance of one sample (without nitroalkane or nitroalkanol) of the composition of this invention indicated the following:

| | |
|---|---|
| Dimethyloluron | 39.2% |
| Dimethoxyuron | 22.1% |
| Monomethyloluron | 18.4% |
| Trimethylolurea | 9.6% |
| Sym. Dimethylolurea | 5.5% |
| Monomethylolurea | 5.3% |

The reaction of formaldehyde and urea is preferably, but not necessarily, carried out under alkaline conditions at elevated temperatures of from about 40° C. to reflux temperature at ambient pressure, preferably at reflux temperature. When the reaction is complete, the reaction mixture is cooled to about 55°–65° C. and the pH is adjusted to about 5.0–7.0. The pH adjustment can be effected with any water-soluble mineral or organic acid. Generally a dilute acid such as dilute hydrochloric, phosphoric, sulfuric, p-toluene sulfonic, etc. will be used. The heating period is then continued at 55°–60° C. about one more hour to ensure complete reaction. The reaction product is then allowed to cool and if desired can be diluted to about 25–45% solids, which hastens the cooling process.

The urea-glyoxal resins useful in the practice of this invention are known in the art. They are commercially available from e.g., Sun Chemical Corporation, Chester, South Carolina, under the trademark "Permafresh". Any of the urea-glyoxal resins may be used in the practice of this invention.

A 25% dispersion or solution of the resin mixture is preferred in the art for treating the textile or other non-woven, cellulosic object. Preferably it is used with a catalyst, e.g. magnesium chloride or zinc nitrate. It is convenient to prepare the catalyst as a 25% aqueous solution and mix one part of the catalyst solution with four parts of the 25% resin solution. The textile or other non-woven, cellulosic object is then saturated with the mixture, pressed to about a 60% wet pickup, then heated at, e.g., about 350° F. to cure the resin.

It is contemplated that the products and objects which will benefit from the wrinkle resistance conferred by the resin of the present invention will include but will not be limited to those made from natural fibers, principally wool and cellulose, both woven and non-woven. Of the woven fibers, cotton fabrics are the ones which are expected to receive the most benefit. Non-woven fabrics are usually made from cellulose fibers, e.g. wood fibers, and are used extensively. While much of it goes to disposable items where wrinkle resistance may not be of great importance, still the market for durables is increasing especially in clothing interliners, bedding, carpets, draperies, etc., where wrinkle resistance is important. The term fabric as used herein is intended to encompass such cellulose containing product. Actually, it is contemplated that any cellulose containing product, including but not limited to textiles, paper goods, particle board, laminated plywood and the like, which is to be treated with a crosslinking agent, e.g. a urea-aldehyde resin, will benefit from treatment with a nitroalkane or nitroalkanol.

Important advantages accrue from the use of nitroalkanes and nitroalkanols in the treatment of textiles and non-woven cellulosic products with urea-aldehyde resins. The treated fabrics have much improved "hand" when the treatment is conducted in the presence of nitroalkanes or nitroalkanols, and the residual aldehyde is much reduced, thereby improving the environment. Furthermore, the present invention makes it possible to use inexpensive urea-formaldehyde (uron) resins in the wrinkle-resistant process yet produce comparable to or better than the high cost resins such as urea-glyoxal resins. Also, the nitroalkanols effect a quicker cure of the resins at the temperatures customarily used, or at lower temperatures, they effect a better cure giving a better recovery angle. Thus they tend to conserve energy. Other advantages will also be apparent to those skilled in the art.

The invention will be better understood with reference to the following examples. It is understood that the examples are intended for illustration only and it is not intended that the invention be limited thereby.

EXAMPLE 1

Formaldehyde, 37% solution, 324 g (4 moles) and urea, 60 g (1 mole) were charged to a reaction vessel equipped with a condenser and an agitator. The pH was adjusted to 10.8 using 50% NaOH. The mixture was heated to 60° C. for five hours thereby forming a solution of a conventional urea-formaldehyde prepolymer.

The mixture was divided in two parts of 192 g each. One part was set aside and designated Solution A. To the other part, Solution B, was added 76.2 g of a 65% aqueous solution of 2-nitro-2-methyl-1-propanol (49.53 g dry basis, 0.48 moles) and 41.54 g of water to provide 45% total solids. This solution was further diluted to 25% solids by adding 44.5 parts of water per 55.5 parts of Solution B. To 100 parts of this solution was added 25 parts of magnesium chloride, 25% aqueous solution.

The wrinkle recovery was determined by Test Method 66–1968 of the American Association of Textile Colorists and Chemists. A piece of cotton cloth, unsized, was dipped into the resin solution, patted dry and stretched, then placed in an oven at 180° C. for ninety seconds. Ten specimens, 40 mm long and 15 mm wide, were cut from the cloth, five with their long dimension parallel to the warp and five with their long dimension parallel to the filling. The recovery angle was then determined as set forth in the test method on test specimens. The values were averaged and expressed as total recovery angle. Similar specimens were treated with the same resin solution (A) but without the addition of NMP. The results obtained are given in the table. The reduction in residual free formaldehyde was notable. The fabric treated with solution (B) had superior hand to that treated with solution (A).

A sample of non-woven cellulosic material is treated with this resin. It has a high wet strength and good dimensional stability.

TABLE

| Example Number | Free Formaldehyde on Cloth | Recovery Angle, ° | Tensile Strength |
|---|---|---|---|
| 1A | 220 ppm | 328 | 23.9 |
| 1B | 115 ppm | 318 | 21.2 |
| 2A | 615 ppm | 281 | 23.1 |
| 2B | 215 ppm | 315 | 23.4 |
| 3A | 310 ppm | 262 | 30.6 |
| 3B | 110 ppm | 265 | 29.5 |
| 12A | 630 ppm | 320 | 20.4 |
| 12B | 480 ppm | 335 | 21.2 |

EXAMPLE 2

Formaldehyde, 37% aqueous solution, 910 g (11.2 moles) was delivered to a round bottom flask and the pH was adjusted to 7.5. Urea 120 g (2 moles) was added. A stirrer, condenser and thermometer were attached. The reaction mixture was heated two hours at reflux while stirring. It was then allowed to cool and the solution, 45.16% solids, was divided into two parts, designated A and B, respectively.

Part A was diluted to about 25% by adding 44.5 parts of water to 55.5 parts of A. There was then added 25 parts of a 25% solution of magnesium chloride. This solution was used as a control to treat cloth as described in Example 1.

Part B, 465 g, was mixed with 152.4 parts of a 64.8% solution of NMP, giving a total of 617.4 g of a 50% solution. There was added 68.55 g of water to yield a 25% solution. To 55.5 parts of this solution there was added 44.5 parts of water to give a 25% solution and finally there was added 25 g of a 25% solution of magnesium chloride. This solution was then used to treat cloth. The results are given in the table. The cloth treated with the NMP and resin exhibited good hand—smooth and soft. The control cloth was smooth but stiff.

A sample of non-woven cellulosic material is treated with this resin. It has a high wet-strength and good dimensional stability.

EXAMPLE 3

The experiment of Example 2 was repeated in all essential details except that the urea and formaldehyde were reacted in a mole ratio of 1:1.6 respectively. The control cloth had poor hand—a stiff, rough feel. The cloth treated with NMP had good hand, smooth and pliable. The data are given in the table.

A sample of non-woven cellulosic material is treated with this resin. It has a high wet-strength and good dimensional stability.

EXAMPLE 4

The experiment of Example 1 is repeated in all essential details except that 2-nitro-1-butanol is substituted for NMP. Cotton cloth so treated shows a high recovery angle. A sample of non-woven cellulosic material so treated has a high wet-strength and good dimensional stability.

EXAMPLE 5

The experiment of Example 1 is repeated in all essential details except that tris(hydroxymethyl)nitromethane in equimolar quantities is substituted for NMP. Cotton cloth so treated shows a high recovery angle. A sample of non-woven cellulosic material so treated has a high wet-strength and good dimensional stability.

EXAMPLE 6

The experiment of Example 1 is repeated in all essential details except that 2-nitro-2-methyl-1,3-propandiol is substituted for NMP. Cotton cloth so treated shows a high recovery angle. A sample of non-woven cellulosic material so treated has a high wet-strength and good dimensional stability.

EXAMPLE 7

The experiment of Example 1 is repeated in all essential details except that 2-nitro-2-ethyl-1,3-propanediol is substituted for NMP. Cotton cloth so treated shows a high recovery angle. A sample of non-woven cellulosic material so treated has a high wet-strength and good dimensional stability.

EXAMPLE 8

The experiment of Example 1 is repeated in all essential details except that nitromethane is substituted for NMP on an equimolar basis and three moles of formaldehyde per mole of nitromethane are added. Cotton cloth so treated shows a high recovery angle. A sample of non-woven cellulosic material so treated has a high wet-strength and good dimensional stability.

EXAMPLE 9

The experiment of Example 1 is repeated in all essential details except that nitroethane is substituted for NMP on an equimolar basis and two moles of formaldehyde per mole of nitroethane are added. Cotton cloth so treated shows a high recovery angle. A sample of non-woven cellulosic material so treated has a high wet-strength and good dimensional stability.

EXAMPLE 10

The experiment of Example 1 is repeated in all essential details except that nitropropane is substituted for NMP on an equimolar basis and two moles of formaldehyde per mole of nitropropane are added. Cotton cloth so treated shows a high recovery angle. A sample of non-woven cellulosic material so treated has a high wet-strength and good dimensional stability.

EXAMPLE 11

The experiment of Example 1 is repeated in all essential details except that after the urea-formaldehyde resin is prepared, it is further heated at 50° C. for two hours with 0.5 mole of glyoxal per mole of urea. The pH is adjusted to 9.2 and 2-nitro-2-methyl-1-propanol (0.75 mole) is added. This mixture is used to treat cotton cloth and a sample of non-woven cellulosic material.

EXAMPLE 12

A. To 55.5 ml of a 45% aqueous solution of a urea-glyoxal resin was added 44.5 ml of water. The resin was obtained from Sun Chemical Company and was designated "Permafresh LF". To this solution there was added 22 g of a 65% solution of NMP and 25 ml of a 25% magnesium chloride solution giving a total of 150 ml. The pH was adjusted to about 5 with 1% sodium hydroxide solution. A sample of cloth was treated with this solution and tested for wrinkle recovery as described in Example 1. The results are given in the table.

B. The foregoing experiment was repeated in all essential details except that 25 ml of water was substituted for the NMP. The results are given in the table.

EXAMPLE 13

The experiment of Example 12A is repeated in all essential details except that 1-nitropropane is substituted for NMP on an equimolar basis and two moles of formaldehyde are added. A wrinkle resistant fabric is obtained.

EXAMPLE 14

The experiment of Example 13 is repeated in all essential details except that nitromethane is substituted for NMP on an equimolar basis and three moles of formaldehyde are added. A wrinkle resistant fabric is obtained.

EXAMPLE 15

The experiment of Example 13 is repeated in all essential details except that 1 mole of 2-nitropropane and 1 mole of formaldehyde are substituted for NMP. A wrinkle resistant fabric is obtained.

EXAMPLE 16

The experiment of Example 1 is repeated in all essential details except that Superez AVG, a carbamate resin manufactured by Proctor Chemical Company, is substituted for urea-formaldehyde. The fabric treated with NMP has superior hand to that which was not treated with NMP.

EXAMPLE 17

The experiment of Example 1 is repeated in all essential details except that Resimenl 842, a methylated methylolmelamine made by Monsanto Chemical Company, is substituted for urea-formaldehyde. The fabric treated with NMP has superior hand to that which was not treated with NMP.

EXAMPLE 18

The experiment of Example 1 is repeated in all essential details except that Reactant 475, a triazone resin made by Quaker Chemical Company, is substituted for urea-formaldehyde. The fabric treated with NMP has superior hand to that which was not treated with NMP.

EXAMPLE 19

Two padding baths were prepared as follows:

|  | A | B |
| --- | --- | --- |
| Water | 31.54 lb | 32.13 lb |
| Crosslinking agent, 43% | 5.04 | 3.26 |
| NMP, 64.8% solution | — | 1.19 |
| Surfactant, 50% | 0.21 | 0.21 |
|  | 4.20 | 4.20 |
| Catalyst | 1.01 | 1.01 |

The crosslinking agent was a 43% buffered solution of 4,5-dihydroxy-1,3-dimethylolethyleneurea (Protocol C, marketed by Proctor Chemical Company). The catalyst was a 50% solution of zinc nitrate.

Samples of cotton cloth were treated with the above formulations and were dried for 90 seconds at 270° F. They were then cured by heating at 350° F. for 60, 120, and 240 seconds, respectively. The free formaldehyde residue on the cloth was then determined. The results were as follows:

| Cure Time | Formaldehyde | | Formaldehyde Reduction |
| --- | --- | --- | --- |
|  | A | B |  |
| 60 seconds | 950 ppm | 300 ppm | 68.4% |
| 120 seconds | 900 ppm | 290 ppm | 64.2% |
| 240 seconds | 800 ppm | 260 ppm | 67.4% |

EXAMPLE 20

The experiment of Example 19 was repeated in all essential details except that the concentration of crosslinking agent was doubled, giving the following formulations:

|  | A | B |
| --- | --- | --- |
| Water | 26.50 lb | 27.68 lb |
| Crosslinking agent, 43% | 10.08 | 6.52 |
| NMP, 64.8% | — | 2.38 |
| Surfactant, 50% | 0.21 | 0.21 |
|  | 4.20 | 4.20 |
| Catalyst | 1.01 | 1.01 |

The residual formaldehyde remaining on the cloth after curing was as follows:

| Cure Time | Formaldehyde | | Formaldehyde Reduction |
| --- | --- | --- | --- |
|  | A | B |  |
| 60 seconds | 2820 ppm | 1285 ppm | 54% |
| 120 seconds | 2646 ppm | 1145 ppm | 56% |
| 240 seconds | 2228 ppm | 1000 ppm | 55% |

We claim:

1. A method of preparing a wrinkle-resistant fabric by the steps of (a) impregnating the fabric with a curable urea-formaldehyde resin and a catalyst therefor and from 0.25 to 3.0 moles of a nitroalkanol per mole of urea, said nitroalkanol being represented by the formula

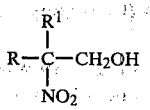

where R and $R^1$ are hydrogen, methyl, ethyl or hydroxymethyl and can be the same or different and (b) heating to 225° F. to 350° F. to effect a cure of the resin.

2. The method of claim 1 wherein the fabric is a woven textile of wool or cotton.

3. The method of claim 1 wherein the fabric is a nonwoven fabric of cellulose fibers.

4. A wrinkle-resistant fabric obtained by the method of claim 1.

5. A woven fabric of claim 4 made of wool or cotton.

6. A non-woven fabric of claim 4 made from cellulose fibers.

7. A method of preparing a wrinkle-resistant fabric by the steps of (a) impregnating the fabric with a composition comprising a curable urea-formaldehyde resin and an acid catalyst therefor and a nitroalkane of 1 to 3 carbon atoms or mixture thereof in a mole ratio of from 0.25 to 3.0 per mole of urea and (b) heating to 225° F. to 350° F. to effect a cure of the resin.

8. The method of claim 7 wherein the fabric is a woven textile of wool or cotton.

9. The method of claim 7 wherein the fabric is a nonwoven fabric of cellulose fibers.

10. A wrinkle-resistant fabric obtained by the method of claim 7.

11. A woven fabric of claim 10 made of wool or cotton.

12. A non-woven fabric of claim 10 made from cellulose fibers.

13. The method of claim 1 or claim 7 wherein glyoxal is reacted with the urea-formaldehyde resin in an amount of up to 1.5 moles per mole of urea.

14. The treated product of claim 4 or claim 10 wherein the urea-formaldehyde resin is modified with up to 1.5 moles of glyoxal per mole of urea.

15. A method of reducing residual aldehyde on a product when treated with a urea-aldehyde resin and heated to cure the resin comprising the step of treating the product prior to the heating step with a nitroalkanol corresponding to the formula

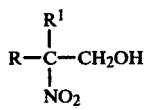

where R and $R^1$ are hydrogen, methyl, ethyl or hydroxymethyl and can be the same or different.

16. A method of preparing a wrinkle-resistant fabric by the steps of (a) impregnating the fabric with a composition comprising a cross-linking agent and a nitroalkanol of the formula

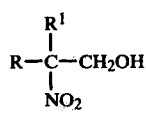

where R and $R^1$ are hydrogen, methyl, ethyl or hydroxymethyl and can be the same or different, or a mixture thereof and (b) heating to 225° F. to 350° F. to effect a cure.

17. The method of claim 16 wherein the nitroalkanol is present in an amount of from 0.18 to 1.42 parts per part of resin by weight.

18. The method of claim 16 wherein the cross-linking agent is an ethylene urea, a carbamate of the formula

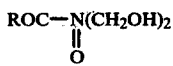

where R is alkyl, hydroxyalkyl or alkoxyalkyl of 2-methylethyl carbamate, methylated methylolmelamine or a triazone of the formula

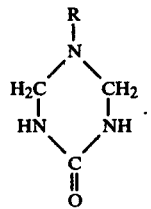

19. The method of claim 16 wherein the cross-linking agent is 2-nitro-2-methyl-1-propanol.

20. The method of claim 16 wherein the cross-linking agent is trishydroxymethylnitromethane.

21. The method of claim 16 wherein the cross-linking agent is 2-nitro-2-methyl-1,3-propanediol.

22. The method of claim 16 wherein the cross-linking agent is 2-nitro-2-ethyl-1,3-propanediol.

23. The method of claim 16 wherein the cross-linking agent is 2-nitro-1-butanol.

24. A wrinkle-resistant fabric obtained by the method of claim 16.

25. A method of preparing a wrinkle-resistant fabric by the steps of (a) impregnating the fabric with a composition comprising a cross-linking agent adapted to conferring wrinkle resistance and durable press properties, an acidic catalyst and a nitroalkane of 1 to 3 carbon atoms, or a mixture thereof and (b) heating to 225° F. to 350° F. to effect a cure of the resin.

26. The method of claim 25 wherein the nitroalkane is nitromethane.

27. The method of claim 25 wherein the nitroalkane is nitroethane.

28. The method of claim 25 wherein the nitroalkane is 1-nitropropane.

29. The method of claim 25 wherein the nitroalkane is 2-nitropropane.

30. The method of claim 25 wherein the nitroalkane is present in an amount of 18-142 parts per 100 parts of resin by weight.

31. The method of claim 25 wherein the cross-linking agent is ethylene urea, a carbamate of the formula

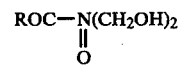

where R is alkyl, hydroxyalkyl or alkoxyalkyl of 2-methylethyl carbamate, methylated methylolmelamine, or a triazone of the formula

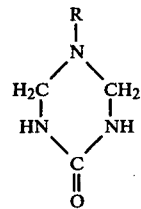

32. A wrinkle-resistant fabric obtained by the method of claim 25.

UNITED STATES PATENT AND TRADEMARK OFFICE
CERTIFICATE OF CORRECTION

PATENT NO. : 4,323,624

DATED : April 6, 1982

INVENTOR(S) : Jerry H. Hunsucker et al

It is certified that error appears in the above-identified patent and that said Letters Patent are hereby corrected as shown below:

Column 2, line 52, "then" should read -- them --

Column 6, line 4, following "produce" insert -- results --

Signed and Sealed this

Seventeenth Day of August 1982

[SEAL]

Attest:

Attesting Officer

GERALD J. MOSSINGHOFF

Commissioner of Patents and Trademarks